United States Patent
Shain et al.

(10) Patent No.: US 9,959,074 B1
(45) Date of Patent: May 1, 2018

(54) ASYNCHRONOUS IN-MEMORY DATA BACKUP SYSTEM

(71) Applicant: EMC IP Holding Company LLC, Hopkinton, MA (US)

(72) Inventors: Randall Shain, Wrentham, MA (US); Kenneth J. Taylor, Franklin, MA (US); Adrian Michaud, Carlisle, MA (US); Stephen Wing-Kin Au, Norwood, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 15/363,779

(22) Filed: Nov. 29, 2016

(51) Int. Cl.
  *G06F 12/00* (2006.01)
  *G06F 3/06* (2006.01)
  *G06F 15/173* (2006.01)

(52) U.S. Cl.
  CPC .............. *G06F 3/065* (2013.01); *G06F 3/064* (2013.01); *G06F 3/067* (2013.01); *G06F 3/0619* (2013.01); *G06F 15/17331* (2013.01)

(58) Field of Classification Search
  None
  See application file for complete search history.

(56) References Cited

U.S. PATENT DOCUMENTS

| | | | | |
|---|---|---|---|---|
| 7,925,925 B2* | 4/2011 | Royer, Jr. | ........... | G06F 11/1441 711/103 |
| 8,312,326 B2* | 11/2012 | Royer, Jr. | ........... | G06F 11/1441 714/43 |
| 2012/0303581 A1* | 11/2012 | Calder | .............. | G06F 17/30575 707/626 |
| 2016/0132396 A1* | 5/2016 | Kimmel | .............. | G06F 12/0246 714/6.3 |

\* cited by examiner

*Primary Examiner* — Brian Peugh
(74) *Attorney, Agent, or Firm* — Ryan, Mason & Lewis, LLP

(57) ABSTRACT

Data backup systems and methods are provided to asynchronously mirror in-memory checkpoint images generated by a process executing on a host system. For example, a data backup system is configured to: receive a checkpoint request message to store a copy of a checkpoint image which includes memory pages residing in a first memory region of memory on the host system; pull a copy of metadata associated with the memory pages from a second memory region of memory on the host system; pull a copy of the memory pages of the checkpoint image from the first memory region; generate a copy of the checkpoint image using the memory pages and associated metadata pulled from the host system; and store the copy of the checkpoint image in a storage device with an in-memory format that is the same as the checkpoint image residing in the first memory region on the host system.

20 Claims, 9 Drawing Sheets

ASYNCHRONOUS IN-MEMORY DATA BACKUP SYSTEM

FIELD

This disclosure relates generally to data storage techniques and, in particular, to techniques for managing checkpoint images in data storage systems.

BACKGROUND

A host computing system typically executes an application (e.g., a database application) which requires application data to be stored locally on the host computing system and/or remotely on one or more data storage arrays. A host computing system typically includes volatile byte addressable random access memory (RAM) resources to support low-latency and high throughput data access operations, as well as non-volatile block addressable storage devices to support data persistence. A data storage array typically includes storage devices that provide both high speed non-volatile random access storage capacity (e.g., flash memory devices) and slower non-volatile large storage capacity (e.g., hard disk drives (HDDs)).

Currently, in-memory data management systems are being designed to rely on primary data residency in main memory (e.g., RAM) and, primary data persistence in either low-latency non-volatile, byte addressable memory or maintained using traditional storage-based persistence methods that include performing write I/O (input/output) to logs and data files residing on block devices. Any type of byte-addressable memory resource is either volatile (e.g. DRAM) or still considered to be very expensive (e.g., Storage Class Memory) and, consequently, not a candidate for long term storage of backup copies of primary data (e.g., in-memory data). In this regard, in-memory data management systems typically implement methods for backing up in-memory data by storing versions of in-memory data to other, more cost effective, types of storage.

For example, if an in-memory data management system already implements a traditional storage-based persistence method to guarantee data persistence, then the system will typically back up those persisted storage assets (logs and data files) to inexpensive backup media such as HDD or NAND Flash. If the in-memory data management system relies on byte-addressable non-volatile memory for persistence, then the system will typically have to copy that data into a file format on a block device in order to back it up to lower cost media, thus taking it out of the memory domain. While "restart" functions can be performed after system failure from the non-volatile byte-addressable memory, "recovery" functions most often will need to rely on a completely separate set of processes that read data from files on block devices. In both of the examples above, the application is not functioning in a memory mode or being programmed to an in-memory module during the recovery processes. These conventional techniques are inefficient since, for example, the reformatted data is not a directly consumable form of data for an in-memory type application.

SUMMARY

Illustrative embodiments of the invention generally include systems and methods for implementing a data backup system that is configured to asynchronously mirror in-memory checkpoint images generated by a process executing on a host computing system.

One embodiment includes a method implemented by a data backup system. The data backup system receives notification of a checkpoint request issued by a process executing on a host computing system to store a copy of a checkpoint image comprising one or more memory pages that reside in a first memory region of memory on the host computing system. In response to the notification of the checkpoint request, the data backup system pulls a copy of metadata from a metadata log residing in a second memory region of memory on the host computing system, wherein the metadata is associated with the one or more memory pages of the checkpoint image, and pulls a copy of the one or more memory pages of the checkpoint image from the first memory region of memory on the host computing system. The data backup system generates a copy of the checkpoint image using the copies of the one or more memory pages and the associated metadata pulled from the host computing system then stores the copy of the checkpoint image in a storage device on the data backup system. The copy of the checkpoint image stored in the storage device on the data backup system comprises a same in-memory format as the checkpoint image residing in the first memory region of memory on the host computing system.

Other embodiments of the invention include, without limitation, computing systems and articles of manufacture comprising processor-readable storage media.

DETAILED DESCRIPTION

Figure 1:
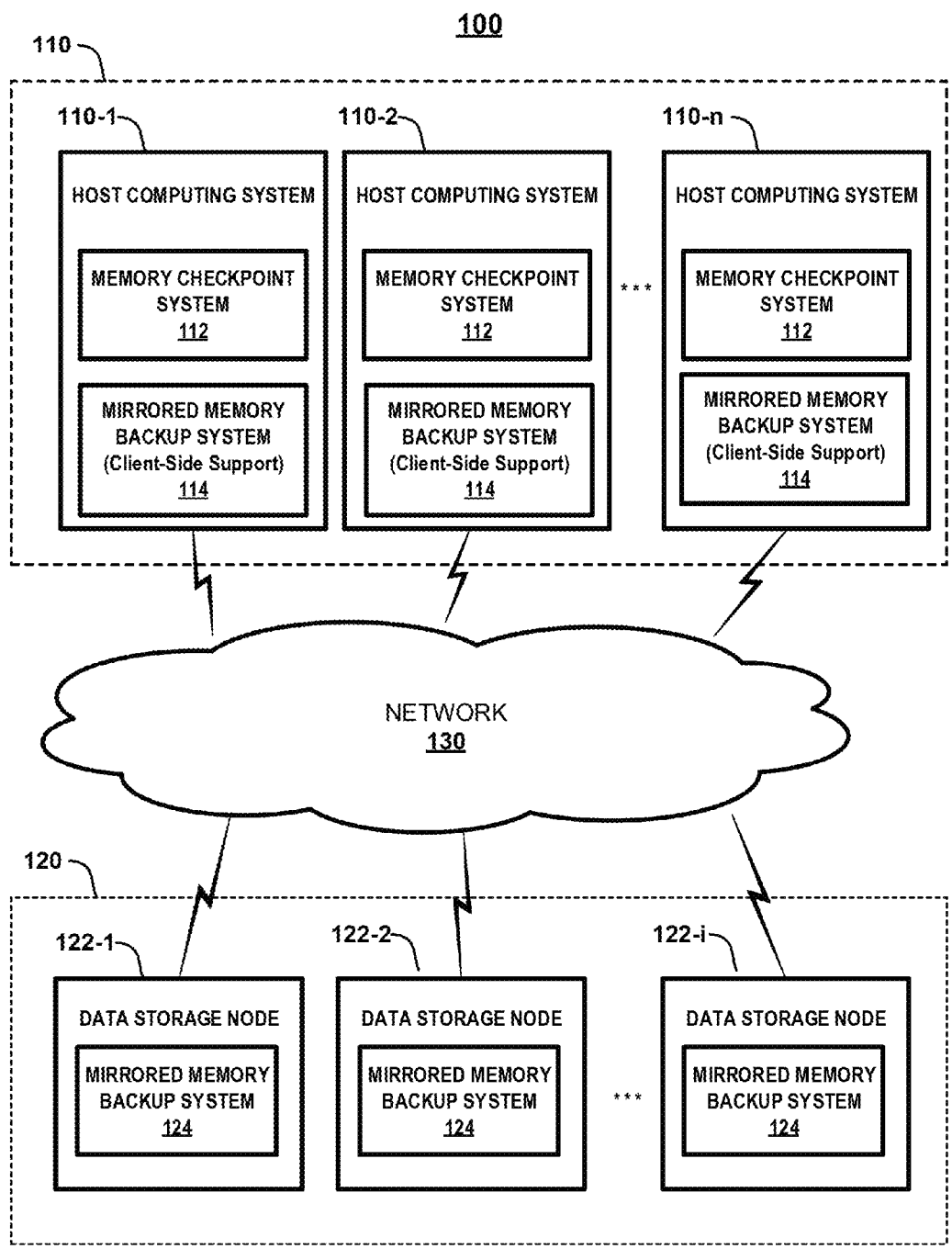
FIG. 1 is a high-level schematic illustration of a computing system which implements a mirrored memory backup system that is configured to store memory checkpoint images to a backup system, according to an embodiment of the invention.

Illustrative embodiments of the invention will now be explained in further detail with regard to systems and methods for implementing a data backup system that is configured to asynchronously mirror in-memory checkpoint images generated by a process executing on a host computing system. For example, FIG. 1 is a high-level schematic illustration of a computing system 100 which implements a mirrored memory backup system that is configured to store memory checkpoint images to a backup system, according to an embodiment of the invention. The computing system 100 comprises a plurality (n) of host computing systems 110-1, 110-2, . . . , 110-*n* (collectively referred to as host computing systems 110), and a data storage system 120. The data storage system 120 comprises a plurality (i) of data storage nodes 122-1, 122-2, . . . , 122-i (collectively referred to as data storage nodes 122). The host computing systems 110 and data storage nodes 122 are operatively connected over a communications network 130. The communications network 130 is configured to enable network communication between the host computing systems 110, between the data storage nodes 122, and/or between the host computing systems 110 and the data storage nodes 122, depending on the configuration of the computing system 100.

While the communications network 130 is generically depicted in FIG. 1, it is to be understood that the communications network 130 may comprise any known communication network such as, but not limited to, a WAN (wide area network), a LAN (local area network), a WLAN (wireless local area network), etc., or combination of networks, which implement a RDMA (remote direct memory access) protocol such as, but not limited to, IB (Infiniband), RoCE (RDMA over Converged Ethernet), or iWARP (internet Wide Area RDMA Protocol).

Furthermore, while FIG. 1 provides a generic illustration of a computing system, it is to be understood that the term "computing system" as used herein is intended to be broadly construed, so as to encompass, for example, a private or public computing system (e.g. cloud computing system, online social network), or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any application that implements a data storage system, or combination of data storage systems, including, but not limited to a storage area network (SAN) system, a direct attached storage (DAS) system, a Hadoop Distributed File System (HDFS), as well as other types of data storage system architectures comprising clustered or distributed virtual and/or physical infrastructure.

Moreover, the data storage nodes 122 may include various types of storage resources for storing data that is utilized and/or generated by the host computing systems 110. For example, the data storage nodes 122 may include one or more different types of persistent storage devices such as HDDs (hard disk drives) or SSDs (solid-state drives), or other types and combinations of non-volatile memory. In one embodiment, the data storage nodes 122 comprise one or more storage products such as, by way of example, VNX® and Symmetrix VMAX®, both commercially available from EMC Corporation of Hopkinton, Mass. The EMC Symmetrix VMAX® systems are enterprise-class storage platforms comprising high performance, scalable storage arrays, which can be implemented for hyper-scale computing systems.

The host computing systems 110 are configured to host and execute one or more applications. It is to be understood that the term "application" as used herein refers to any type of software application, including desktop applications, server applications, database applications, and mobile applications. In addition, the terms "application process" and "process" refer to an instance of an application that is being executed on a host computing system. In one embodiment, the host computing systems 110 comprise server nodes (e.g., a Windows server, a Sun Solaris server, an HP server, a Linux server, etc.) which host one or more applications. As noted above, in one embodiment, the host computing systems 110 and the data storage system 120 comprise constituent components of a data center that performs data computing and data storage functions to support one or more network applications and/or on-line services that are associated with private or public entities. Depending on the implementation of the computing system 100, the host computing systems 110 are configured to, e.g., execute business logic, execute scripts and services to query databases, and perform other computing functions that are needed to host and deliver consumer or business applications and services to multiple end users, service providers, and/or organizations.

As further shown in FIG. 1, each of the host computing systems 110 comprises a memory checkpoint system 112 and client-side components of a mirrored memory backup system 114. In addition, the data storage nodes 122 comprise server-side components of a mirrored memory backup system 124. In general, the memory checkpoint system 112 of a given host computing system 110 is configured to generate persistent checkpoints of in-memory data of an application process executing on the given host computing system 110. In one embodiment of the invention, as explained in further detail below, the memory checkpoint system 112 is configured to generate checkpoints of a process anonymous virtual memory area (VMA) (e.g., heap memory) which is defined in volatile memory and persisted to predefined checkpoint regions on a non-volatile RDMA-capable device (e.g., Non-Volatile Dual In-line Memory Module (NVDIMM) based on Intel 3D XPoint technology) on the host computing system 110. The term "virtual memory area" as used herein broadly refers to a region of a process address space which describes a contiguous collection of virtual memory pages with a common policy.

The mirror memory backup system (MMBS) components 114 and 124 (collectively, MMBS 114/124) executing on a given host computing system 110 and data storage node 122 collectively operate to asynchronously mirror copies of memory checkpoint images residing in physical memory on the host computing system 110 to a remote memory/storage residing on the data storage node 122. For example, in one embodiment, the MMBS 114/124 receives notification of a checkpoint request issued by a process executing on a host computing system to store a copy of a checkpoint image comprising one or more memory pages that reside in a first memory region of memory on the host computing system 110. In response to the notification of the checkpoint request, the MMBS 114/124 performs a memory checkpoint process which comprises: (i) pulling a copy of metadata from a metadata log residing in a second memory region of memory on the host computing system 110, wherein the metadata is associated with the one or more memory pages of the checkpoint image; (ii) pulling a copy of the one or more memory pages of the checkpoint image from the first memory region of memory on the host computing system 110; (iii) generating a copy of the checkpoint image using the copies of the one or more memory pages and the associated metadata pulled from the host computing system 110; and (iv) storing the copy of the checkpoint image in a storage device on the remote data storage node 122. The copy of the checkpoint image stored in the storage device on the remote data storage node 122 comprises the same in-memory format as the checkpoint image residing in the first memory region of memory on the host computing system 110. It is to be understood that the term "metadata" as used herein refers to data that defines or otherwise describes other data. The metadata associated with memory pages comprises any type of information that enables, e.g., checkpointing, managing, configuring, processing, analyzing, storing, etc., of memory pages.

The MMBS 114/124 provides a lightweight process to backup checkpointed in-memory data along with associated metadata, while allowing an in-memory application to avoid the marshaling and unmarshaling of data to and from different types of longer-term storage as the checkpoint data that is persisted and protected retains its in-memory format. In one embodiment of the invention, the MMBS 114/124 implements a RDMA protocol to pull checkpointed in-memory data from a host computing system 110 with very minimal assistance or resources executing on the host computing system 110, thereby allowing the host computing system 110 to store a large amount of memory checkpoint images without the need to locally retain more than one persistent copy of each checkpoint-enabled memory image on the host computing system 110.

Indeed, on a fundamental level, the MMBS 114/124 operates to generate a low latency asynchronous mirror of the checkpoint-enabled VMAs on a host computing system 110 by utilizing RDMA techniques so that memory checkpoint images can be backed up almost instantaneously to a data storage node 122. In addition, as explained in further detail below, once a remote mirror copy of a checkpoint image is stored on a remote data storage node 122, the mirror copy of the checkpoint image can be backed up to alternative storage tiers for cost reduction or further manipulation by various processes such as deduplication, compression, encryption, partial-to-full image rollups or even image recall for restoration as part of recovery or application re-platforming.

For purposes of illustration, embodiments of the invention will be discussed in the context of a memory centric architecture (MCA) framework in which applications executing on the host computing systems 110 are provided with additional virtual memory through a memory extension and tiering framework. The term "tiering" as used herein with regard to memory or storage refers to the placement of information on storage infrastructure resource commensurate with implementation of a defined policy. Such policies can take into account a variety of factors including, but not limited to: information utilization usage statistics (e.g., I/O reads, writes, memory access); customer information values associated with levels of service (e.g., gold, silver, bronze, production, test, sandbox, archive); and any other custom tiering stratification criteria. The use of memory tiering in an MCA framework creates a bridge between traditional memory resources (e.g., volatile RAM) and storage resources (e.g., non-volatile ROM, HDD, etc.), wherein a memory tier exposes data on storage as if the data were stored in memory (i.e., data is accessed with loads and stores, instead of with I/O reads and writes). In this regard, an MCA framework addresses an application's need for memory speed latencies and consumption of primary data residence in memory (as opposed to external storage) by maintaining in-memory data in its native memory-centric format, while moving the in-memory data to a most cost efficient location (e.g., external memory or external storage) and maintaining full access to the in-memory data by the application.

An MCA framework is implemented using various MCA library functions to efficiently manage multiple user virtual address spaces comprised of combinations of volatile memory, high throughput low latency next generation non-volatile memory technologies, NAND flash technologies connected to a host in various ways (e.g., PCI-e, SAS/SATA), host-connected disk technology, and various forms of SAN connected storage including both server SANs and traditional storage SANs. An MCA framework provides an alternative "kernel-based" virtual memory manager architecture that is configured to overcome the current limitations and non-deterministic behavior provided by conventional virtual memory manager frameworks, such as the Linux virtual memory manager.

In particular, while most operating systems implement virtual memory, applications cannot address the physical memory directly, instead the operating system translates between the application's virtual address space and the system's physical address space. In this approach, every program has its own private address space and thus can run independently from other programs on the system. In such a system, the memory is organized in pages (typically 4 KB in size), and the translation between virtual and physical address space is performed using a page table. An MCA framework provides an application programming interface for creating server class memory (SCM) tiers that extend memory and for accessing and caching SCM tiers by means of virtual memory, with enhanced memory performance, deterministic access latencies, and effective control over virtual memory.

For example, rather than allocating physical pages from a single system wide page cache as in conventional systems, an MCA framework provides a facility to pre-allocate one or more system wide fixed-size page caches. The term "page cache" as used herein (also referred to as a disk cache) is a cache of disk-based pages kept in main memory (e.g., DRAM) by the OS for faster access. The faster access may result from a relatively faster memory technology and/or from avoiding relatively slow data transfer over a network or legacy bus. A page cache is typically implemented within a kernel via paging memory management facilities and, thus, is generally transparent to applications. Data is transferred between main memory and disk in blocks of fixed size, called "pages." The more requested pages residing in cache, the better the overall performance. In an MCA framework, applications control which page cache to use, which results in a more predictable execution time per process because the OS does not manage a single system wide page cache between competing processes. Moreover, a MCA framework supports pluggable memory-mapping (mmap) and page cache management policies, which control page cache replacement policies, etc. For example, two policies for deciding which pages to evict from a cache are supported: a first-in, first-out (FIFO) policy, and a least recently used (LRU) policy. Moreover, MCA enables bypassing of a virtual file system of a native OS and directly accessing a storage device driver, which when combined with a compatible storage device, further reduces the page fault latency.

Figure 2:
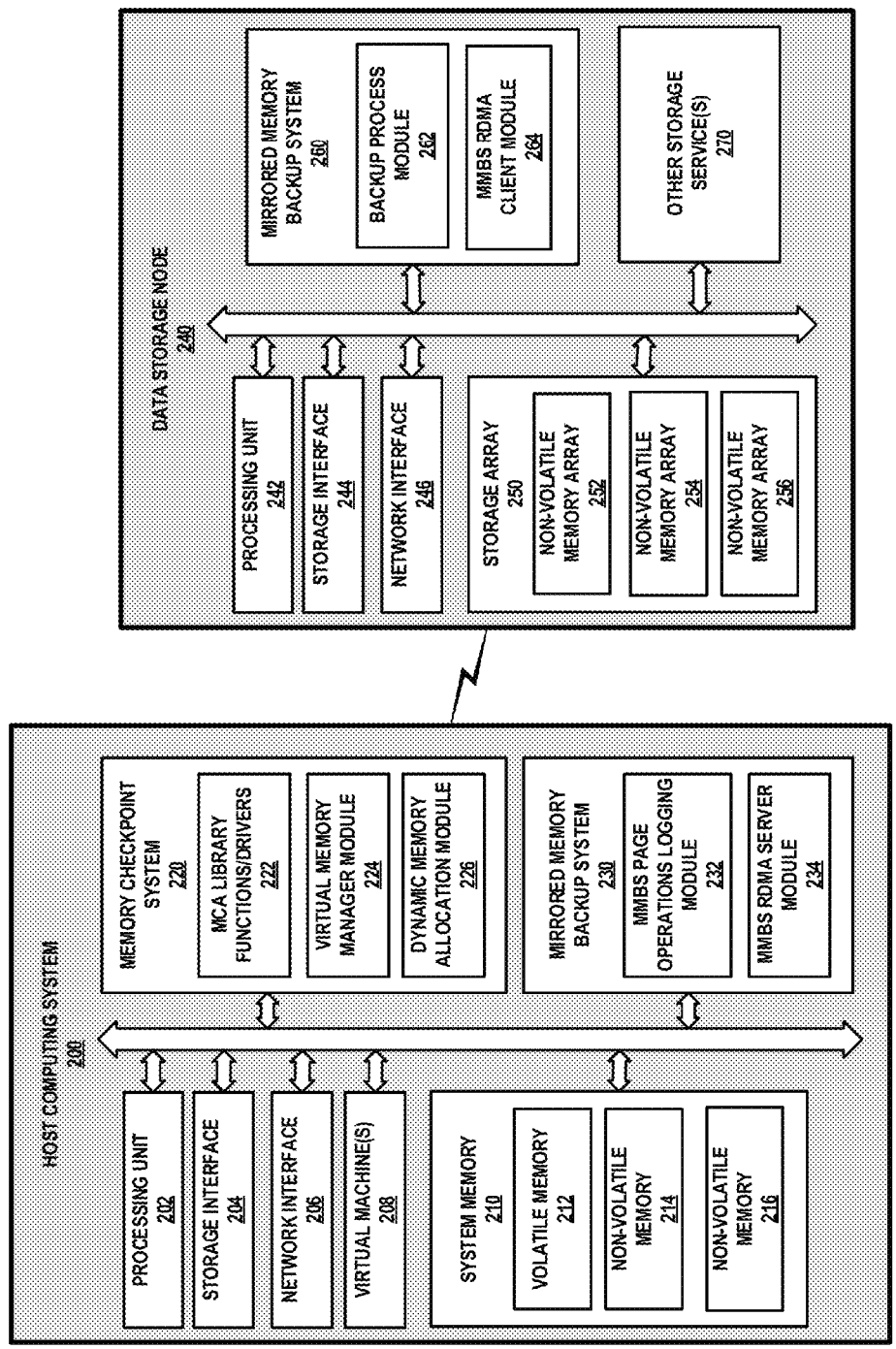
FIG. 2 schematically illustrates an embodiment of the computing system of FIG. 1 showing details of a host computing system and data storage node, which implement a mirrored memory backup system that is configured to store memory checkpoint images to a backup system, according to an embodiment of the invention.

FIG. 2 schematically illustrates an embodiment of the computing system of FIG. 1 showing details of a host computing system and data storage node, which implement a mirrored memory backup system that is configured to store checkpoint images of in-memory data to a remote backup system, according to an embodiment of the invention. More specifically, FIG. 2 shows an embodiment of a host computing system 200 (or "client system") and a data storage node 240 (or remote data backup system"). The host computing system 200 comprises a processing unit 202, storage interface circuitry 204, network interface circuitry 206, system memory 210, a memory checkpoint system 220, and client-side MMBS components 230. The system memory 210 comprises volatile memory 212 and non-volatile memory 214 and 216 (which can provide various levels (e.g., tiers) of local memory based on an MCA framework). The memory checkpoint system 220 comprises MCA library functions and drivers 222, a virtual memory manager module 224, and a dynamic memory allocation module 226, which collectively implement functions and interfaces that enable an application executing on the host computing system 200 to generate and manage in-memory checkpoint images, among other MCA-related functionalities. The MMBS components 230 comprise a page operations logging module 232 and an RDMA server module 234, which implement functions to support asynchronous mirroring of memory checkpoint images (which are generated on the host computing system 200) to the data storage node 240.

The data storage node 240 comprises a processing unit 242, storage interface circuitry 244, network interface circuitry 246, a storage array 250, MMBS components 260, and other storage services 270. The MMBS components 260 comprise a backup process module 262 and a RDMA client module 264, which implement functions to support asynchronous mirroring of memory checkpoint images to the data storage node 240. The storage array 250 comprises various non-volatile memory arrays 252, 254, and 256 for storing/archiving checkpoint images. The various non-volatile memory arrays 252, 254, and 256 may be configured as a hierarchical storage tier based on an MCA framework and utilized as extensions of memory for storing primary application data.

In one embodiment, the system components 220, 230, 260 and 270 comprise software programs which persistently reside in a storage device (e.g., HDD) and which are loaded into respective system memory resources residing on the host computing system 200 and data storage node 240, and then executed by the respective processing units 202 and 242 to perform various functions as described herein. In this regard, the system memory 210, the storage array 250, and other memory or storage media as described herein, which have program code tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing units 202 and 242 may comprise one or more processors that are configured to process program instructions and data to execute a native operating system (OS) and applications that run on the host computing system 200 and data storage node 240. For example, the processing units 202 and 242 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 and 244 enables the processing units 202 and 242 to interface and communicate with the system memory 210, the non-volatile memory arrays 252, 254, and 256 of the storage array 250, and other local storage and off-infrastructure storage media on the respective systems/nodes 200 and 240, using one or more standard communication and/or storage control protocols to read data from or write data to volatile and non-volatile memory/storage devices. The network interface circuitry 206 and 246 enables the host computing system 200 and data storage node 240 to interface and communicate with a network and other system components. The network interface circuitry 206 and 246 may comprise conventional transceivers of a type well known in the art (e.g., network interface cards, I/O adaptors, etc.). In one embodiment, as explained in further detail below, the network interface circuitry 206 and 246 comprises RDMA-enabled network interface cards (e.g., RNIC devices 302 and 304, FIG. 3) to support RDMA functionality of the MMBS modules 230 and 260.

The virtual machine(s) 208 are implemented using a hypervisor platform which executes on the host computing system 200. The virtual machines 208 can be instantiated to execute one or more applications or functions which are hosted by the host computing system 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on the physical infrastructure, e.g., CPUs and/or storage devices, of the host computing system 200. An example of a commercially available hypervisor platform that may be used to implement one or more of the virtual machines 208 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 202 to execute a native operating system and one or more applications hosted by the host computing system 200, and to temporarily store data that is utilized and/or generated by the native OS and application programs running on the host computing system 200. The storage array 250 comprises any type of non-voltage storage media including, but not limited to, HDDs, Flash storage devices, disk storage devices, SSDs, or other types and combinations of non-volatile memory and associated drive types.

With an MCA framework, a data storage system comprising the system memory 210 and the data storage array 250 can be configured to provide multiple, independent memory/storage tiers. For example, the system memory 210 of the host computing system 200 can provide a hierarchical memory tier structure wherein the volatile memory array 212 (highest level in a memory tier) may comprise a dynamic random-access memory tier (e.g., DRAM) or other forms of volatile random-access memory. The non-volatile memory arrays 214 and 216 may comprise storage-class memory (SCM) tiers that are accessible as memory resources, such as NAND Flash and next generation non-volatile memory (NGNVM) devices. In particular, in one embodiment, with an MCA framework, the non-volatile memory arrays 252, 254, and 256 of the data storage array 250 may be configured as a hierarchy of storage tiers residing on the data storage node 240, wherein the non-volatile memory arrays 252, 254, and 256 include, for example, top of rack flash memory array, SSD array, HDD array, network storage tier (e.g., SAN (storage area network)), a serial attached storage (SAS/SATA) tier, for example. Processes running on the host computing system 200 can make data placement selections end-to-end, e.g., across the different memory/storage tiering layers, or within a given memory/storage tiering layer.

As noted above, the memory checkpoint system 220 is configured to allow an application executing on the host computing system 200 to generate persistent memory checkpoint images within a checkpoint-enabled memory region (e.g., heap memory) on the host computing system 200. In one embodiment, the memory checkpoint system 220 is configured to manage the creation, storage, and subsequent usage of memory checkpoint images within, for example, an MCA framework using various functions and interfaces provided by the various components 222, 224, and 226 of the memory checkpoint system 220.

For example, the MCA library functions and drivers 222 provide functions for implementing and utilizing a memory centric architecture comprising a hierarchical memory/storage tiering framework, for example, as described herein. The MCA libraries 222 comprise functions that are executable in a "user space" of a native OS (as opposed to a privileged kernel space of the OS) to manage virtual memory and to manage multiple independent page caches, each utilizing unique portions of different tiers of available SCM technologies in order to provide the most control of application quality of service (QoS). The pages managed in page caches originate from MCA-defined memory-mapped regions of non-volatile datastores that are included in one or more of the non-volatile memories 214 and 216, for example. The memory-mapped regions of the non-volatile datastores provide the ability to persistently maintain page-specific metadata along with the page data itself.

The virtual memory manager module 224 and the dynamic memory allocation module 226 implement both standard functions and well as additional functions to support in-memory checkpointing functions as discussed herein. In the context of an MCA framework, the virtual memory manager module 224 is utilized by an application executing on the host computing system 200 to map a private virtual address space of the application to one or more defined memory-mapped regions of non-volatile datastores, which are resident on one or more of the non-volatile memories (e.g., 214, 216) and/or on one or more of the non-volatile memory arrays 252, 254, and 256. The virtual memory manager module 224 is configured to allocate to an application process a large contiguous collection of virtual memory pages that are dynamically linked, or mapped, to physical pages when actually in use, and then save the contents of inactive pages to persistent storage where the pages can be retrieved (paged in) once again to an actual memory page when the owning application attempts to reference the associated virtual page. Each memory mapped region in tiered memory is fronted by a DRAM page cache to which an application issues loads and stores. The virtual memory manager module 224 can be utilized by an application to move data between an SCM or array device and the DRAM page cache on an on-demand page basis.

Moreover, the dynamic memory allocation module 226 implements standard functions to enable dynamic memory allocation of memory which is explicitly managed by a program that allocates the memory from heap memory, or any region of memory that is allocated for such purpose. For example, in the C programming language, the library function malloc is used to allocate a block of memory in heap memory. The program accesses this block of memory via a pointer that is returned by the malloc function.

In accordance with embodiments of the invention, the dynamic memory allocation module 226 and/or the virtual memory management module 224 are further configured to provide an application the ability to checkpoint a selected VMA through a set of application programming interfaces (APIs) that would enable the application to: (i) create a VMA that will be checkpointed, (ii) allocate/deallocate memory within the VMA; (iii) designate which static data variables to include in any checkpointed copy of VMA page data; (iv) perform a checkpoint operation; (v) set special tags on checkpointed images; (vi) query what checkpoint images have been completed; (vii) select a checkpoint to restore, and perform other related functions. In one embodiment, these additional checkpoint API's are added to the dynamic memory allocation module 226 (e.g., jemalloc).

Modern memory allocators typically utilize some form of a mmap system call that would be implemented on typical Linux/UNIX operating system to allocate anonymous memory that is to be further partitioned for use by the application. This operating system call interacts directly with a virtual memory manager to create and maintain a contiguous list of virtual pages, along with their associated physical pages, which make up a VMA. In accordance with embodiments of the invention, the combination of this system call and the virtual memory manager includes support to create frozen, copy-on-write, versions of the pages on demand when a checkpoint is requested by an application, and to manage the persistent store on which the checkpointed data will be retained until backup is completed. An example embodiment for checkpointing a process anonymous memory VMA that is defined in volatile memory and persisted to a MCA-defined checkpoint region on a block device will be discussed in further detail below with reference to FIG. 3.

The MMBS components 230 and 260 collectively operate to support asynchronous mirroring of memory checkpoint images to the data storage node 240. The page operations logging module 232 is configured to perform functions such as, e.g., recording memory page persistence operations performed on a protected VMA for a checkpoint process, issue notification messages to the MMBS 260 upon the occurrence of certain events (e.g., a checkpoint request issued by a process executing on the host computing system 200), and other functions described herein. In the case of a MCA framework, the page operation logging functionality could be added to a MCA kernel module. The RDMA server module 234 is configured to expose memory windows (e.g., non-volatile memory (NVM) 314 and non-volatile random access memory (NVRAM) 316, FIG. 3) on the host computing system 200 for RDMA Read commands posted by the MMBS 260 operating on the remote data storage node 240.

The backup process module 262 is configured to execute primary functions for performing and managing asynchronous backup of memory checkpoint images generated on the host computing system 200. The RDMA client module 264 operates under the control of the backup process module 262 by issuing client requests to the RDMA server module 234 (over an RDMA fabric) to pull page data and metadata from memory resources on the host computing system 200 in response to "RDMA Read" commands posted by the backup process module 262. The RDMA framework enables the MMBS components 230 and 260 to pull saved checkpoints from the host computing system 200 to the data storage node 250 with minimal resource use and functionality on the host computing system 200, which allows the host computing system 200 to conserve resources for its target purposes. In particular, in one embodiment of the invention discussed below with reference to the example embodiment of FIG. 3, a RDMA protocol is implemented to provide direct memory device-to-memory device transfer of page data and associated metadata without affecting the CPU complex of host computing system 200 or requiring any extra buffering in the main memory of the host computing system 200 to perform the data transfer.

The additional storage services 270 on the data storage node 240 may include remote-driven services such as deduplication, compression, encryption, partial-to-full image rollups, or checkpoint image recall for restoration as part of recovery or application re-platforming. The memory checkpoint system 220 can generate and utilize application defined tags which are included as metadata associated with checkpoint images. The application defined tags can provide relevant information and instructions to enable remote-driven services to extract and further operate on memory checkpoint images as specified by the application defined tags.

Figure 3:
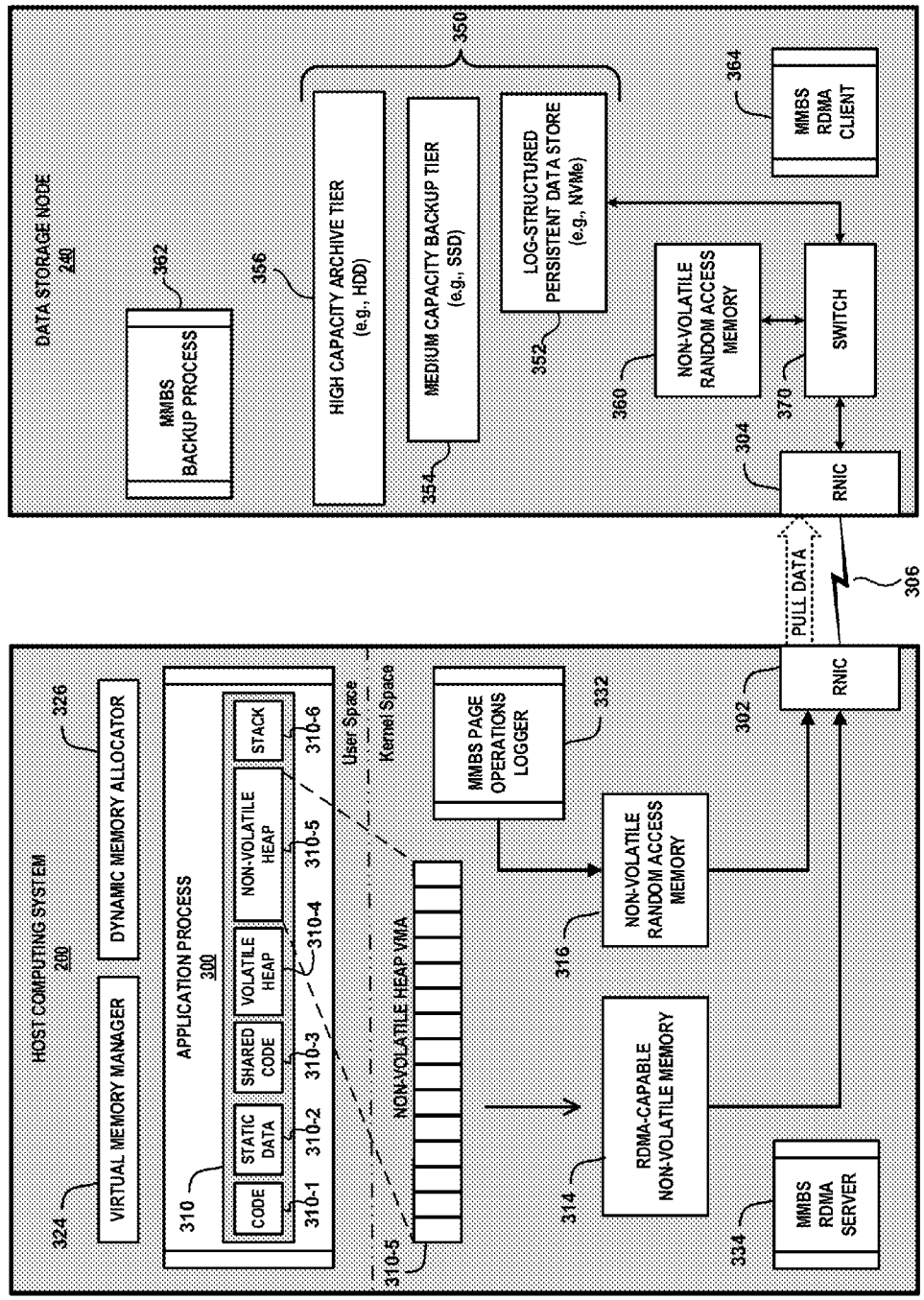
FIG. 3 schematically illustrates a run-time implementation of the system of FIG. 2 according to an embodiment of the invention.

FIG. 3 schematically illustrates a run-time implementation of the system of FIG. 2 according to an embodiment of the invention. In particular, FIG. 3 illustrates a run-time implementation of the host computing system 200 and the data storage node 240 of FIG. 2. As shown in FIG. 3, an application 300, a virtual memory manager 324, and a dynamic memory allocator 326 comprise processes that are executing in non-privileged user space of an operating system of the host computing system 200. The virtual memory manager 324 and the dynamic memory allocator 326 represent running instances of the virtual memory manager module 224 and the dynamic memory allocation module 226, respectively, shown in FIG. 2. In addition, a MMBS page operations logger 332 and MMBS RDMA server 334 comprise processes that execute in a privileged kernel space of the operating system of the host computing system 200. The MMBS page operations logger 332 and the MMBS RDMA server 334 represent running instances of the MMBS page operations logging module 232 and the MMBS RDMA server module 234 shown in FIG. 2. The host computing system 300 further comprises a RDMA-capable non-volatile memory 314 (referred to as NVM 314), a non-volatile random access memory 316 (referred to as NVRAM 316), and a RDMA-enabled network interface controller (RNIC) 302.

The data storage node 240 comprises a RNIC 304, a storage array 350, a MMBS backup process 362, a MMBS RDMA client 364, a NVRAM 360, and a switch 370. The MMBS backup process 362 and the MMBS RDMA client 364 comprise processes that execute on the data storage node 240, and represent running instances of the backup process module 262 and the MMBS RDMA client module 264 of the data storage node 240 shown in FIG. 2. In one embodiment, the storage array 350 is configured as a MCA storage tier which comprises first tier storage 352, a second tier storage 354, and a third tier storage 356. In one embodiment of the invention, the first tier storage 352 comprises a low-latency non-volatile memory array which serves as log-structured persistent data store, the second tier storage 354 comprises a medium capacity backup storage array which is implemented using, e.g., SSD memory, and the third tier storage 356 comprises a high capacity archive storage array which is implemented using, e.g., HDD memory. The storage array 350 provides increasing storage capacity, but higher access latency of storage across the storage tiering hierarchy from the first tier 352 to the third tier 356.

In the example embodiment of FIG. 3, the executing application 300 as shown comprises an associated private virtual address space 310 which comprises a virtual memory mapping for each of a plurality of different virtual memory regions (or virtual memory areas) including, for example, a program code region 310-1, a static data region 310-2, a shared code region 310-3, a volatile heap region 310-4, a non-volatile heap region 310-5, and a program stack region 310-6. Each virtual memory region within the virtual address space 310 is mapped to physical memory via the virtual memory manager 324.

In the example embodiment of FIG. 3, it is assumed that the non-volatile heap memory region 310-5 is selected as a VMA (referred to as target VMA 310-5) that is to be checkpointed on the host computing system 200 (or client system 200), and backed-up on the data storage node 240 (or remote backup system 240). For illustrative purposes, the target VMA 310-5 is shown in FIG. 3 in expanded form to illustrate that the VMA 310-5 comprises a contiguous list of virtual memory pages. The memory pages associated with the target VMA 310-5 are checkpointed on the client system 200 and asynchronously backed up to the remote backup system 240. Each memory checkpoint image of the VMA 310-5 can be archived on the remote backup system 240 as a point-in-time copy of the target VMA 310-5 and operated upon independently in a variety of ways. In this manner, memory checkpoint images of the VMA 310-5 are readily offloaded from the client system 200 to free up valuable storage on the client system 200 for further checkpoint operations.

In the example embodiment of FIG. 3, the NVM 314 on the client system 200 serves as a persistent store for memory pages associated with the target VMA 310-5, which are to be checkpointed. In one embodiment, the NVM 314 is configured as a high-speed load/store non-volatile memory device on the processor memory bus (i.e., SCM). Further, in one embodiment of the invention, the NVRAM 316 (e.g., Flash memory) is implemented on the client system 200 as a high-speed load/store non-volatile memory resource that is used by the page operations logger 332 to store metadata associated with the memory pages of the target VMA 310-5 which are selected for checkpointing. The NVRAM 316 comprises a metadata log that is maintained and written to by the page operations logger 332. In another embodiment of the invention, instead of implementing the NVRAM 316 as a separate memory device to store metadata, a first memory region of the NVM 314 can be utilized to store memory pages of the target VMA 310-5 which are selected for checkpointing, and a second memory region of the NVM 314 can be utilized by the page operations logger 332 to store the metadata associated with the memory pages of the target VMA 310-5 which are selected for checkpointing. In other words, different regions of memory of the NVM 314 can be designated to store page data and associated metadata.

On the remote backup system 240, in one embodiment, the first tier storage 352 (or remote NVM 352) is configured as a non-volatile block storage device which implements a NVM Express (NVMe) interface protocol for access over a PCIExpress (PCIe) bus. The remote NVM 352 provides a log-structured persistent data store to store copies of memory pages of the target VMA which are to be included within a memory checkpoint image that is stored on the remote backup system 240. Further, in one embodiment of the invention, the remote NVRAM 360 is implemented on the remote backup system 240 as a high-speed load/store non-volatile memory resource that is used to temporally store memory page data and associated metadata that is pulled (via RDMA transfer) from the client system 200 under the control of the running instances of the MMBS RDMA client/server processes 364/334.

In one embodiment of the invention, the NVM devices 314 and 352, and the NVRAM devices 316 and 360 are RDMA-enabled memory devices. In one embodiment, the NVM devices 314 and 352, and the NVRAM devices 316 and 360 implement DMA engines with remote main memory addresses with which to exchange data. In another embodiment, methods are implemented to support device-to-device RDMA transfers from the NVM 314 on the client system 200 to the NVRAM device 360 on the remote backup system 240, as well as device-to-device RDMA transfers from the NVRAM 316 on the client system 200 to the NVRAM device 360 on the remote backup system 240. In one embodiment, the NVRAM devices 316 and 360 are implemented using a standard NVMe storage card that utilizes DRAM for performance, NAND Flash for power fail vaulting, and special driver support to allow the entire capacity of the device to be made visible as memory to the RDMA process. An alternative embodiment would be to use a buffer in the main memory of the client system for the transfer.

The RNIC devices 302 and 304 implement standard functionality to enable RDMA data transfers from the client system 200 to the remote backup system 240 over a high-speed RDMA fabric 306. In one embodiment, the RDMA fabric 306 is implemented using a RDMA over Converged Ethernet (RoCE) (e.g. 100 Gb RoCE) network protocol that allows remote direct memory access other an Ethernet network, or some other RDMA supported network protocol such as InfiniBand. Furthermore, the switch device 370 (e.g., PCIe switch device) is an optional feature that can be implemented on the remote backup system 240 to enable direct data transfers between the RNIC 304, the NVM 352, and the NVRAM 360 devices on the remote backup system 240 without requiring CPU or main memory resources. The switch device 370 allows for a greater amount of load to be handled on the backup system 240 without affecting other potential background services.

The example embodiment of FIG. 3 supports the checkpointing of a process anonymous memory VMA that is defined in volatile memory and persisted to a MCA-defined checkpoint region within the NVM 314 (e.g., an RDMA-capable block device). In this embodiment, the MCA region understands the copy-on-write necessity and allows the application to proceed immediately following a flush of all dirty pages to the MCA region. While the MCA framework provides one mechanism for backing a persisted VMA, other methods can be implemented. For example, one alternative technique comprises using a versioned DAX file system on persistent load/store memory devices as a persistent backing for process VMA checkpoints. This alternative method is particularly useful when the system includes a persistent form of load/store addressable memory (e.g. Intel 3D Xpoint technology).

In particular, on this medium, the most common means of organizing and retaining information is by using a specially designed file system that provides direct, uncached, access to file data, similar to when dealing directly with volatile load/store memory, such as DRAM. In this case, however, the memory is already persistent and is addressable as a file when it needs to be located for subsequent use. However, the file is not checkpoint compatible as a backing store for a checkpoint-enabled VMA. A typical file needs to have the copy-on-write ability to allow for a point-in-time frozen view to be created while providing a writable active copy in its place. This is what a versioned file system provides today on traditional block storage. In this regard, the same functionality can be added to a DAX (direct access) file system built for persistent memory, whereby the virtual memory manager can simply direct the file system to create a new version and the prior version will be a frozen checkpoint copy that can then be backed up.

Figure 4A:
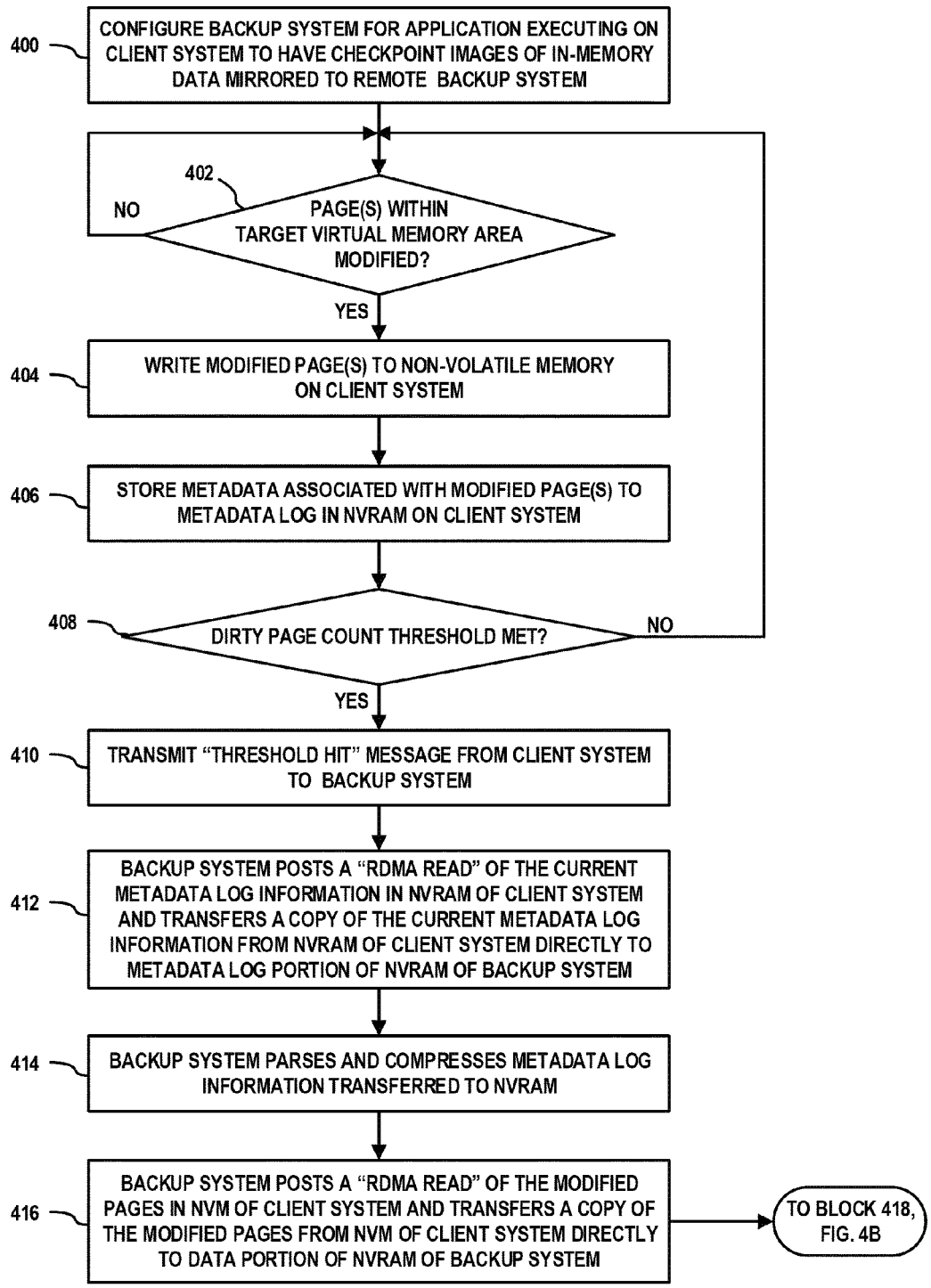
FIGS. 4A and 4B illustrate a flow diagram of a method for storing memory checkpoint images to a backup system, according to an embodiment of the invention.
Figure 4B:
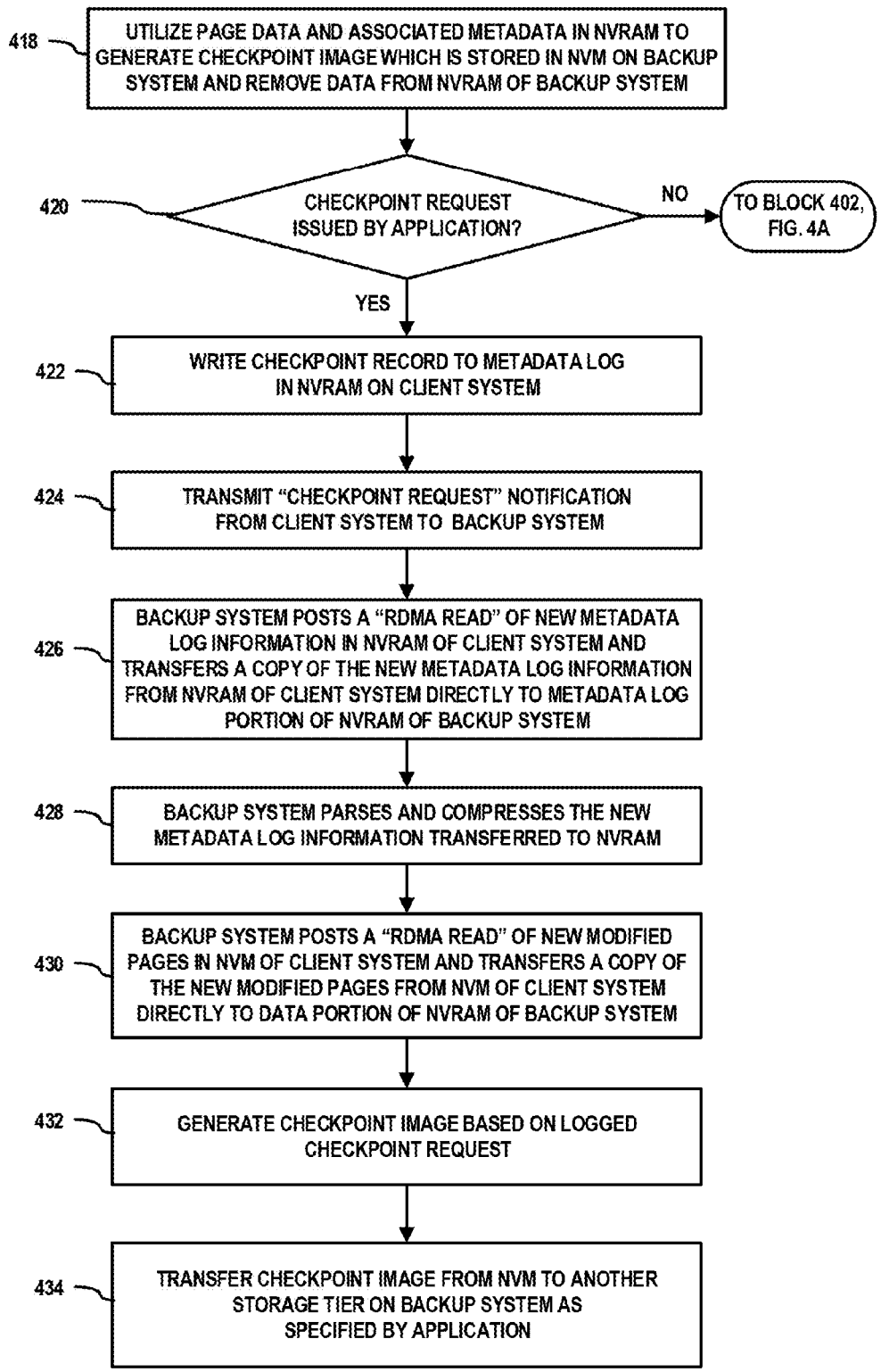

FIGS. 4A and 4B illustrate a flow diagram of a method for storing checkpoint images of in-memory data to a remote backup system, according to an embodiment of the invention. For illustrative purposes, the method of FIGS. 4A and 4B will be discussed in the context of the exemplary system of FIG. 3, as well as with reference to FIGS. 5A-5G which schematically show the state of memory and storage elements in the system of FIG. 3 at given points in time of the process flow shown in FIGS. 4A and 4B. Referring initially to FIG. 4A, an application process 300 executing on the client system (e.g., the host computing system 200, FIG. 3) will configure or otherwise enable operation of a backup system to have memory checkpoint images stored to a remote backup system (e.g., data storage node 240, FIG. 3) (block 400). In one embodiment, the in-memory backup functionality is enabled by configuring the memory checkpoint system and the application process 300 (through APIs of the virtual memory manager 324 and dynamic memory allocator 326) to recognize and configure a given region (e.g., heap memory region) of a virtual address space as a target VMA which is to be checkpointed on the client system and asynchronously backed up to the remote backup system using data mirroring and backup operations discussed herein. For example, in the embodiment of FIG. 3, the non-volatile heap memory region 310-5 of the virtual memory address space 310 of the application process 300 is selected as the target VMA for persistent checkpointing and backup.

During run-time of the application process 300 on the client system, the application process 300 will access physical blocks of in-memory data (e.g., pages) which are stored, for example, in a local low-latency volatile memory and/or non-volatile persistent data store on the client system, and which are referenced by virtual pages within the virtual address space 310 of the application process 300. When it is determined that one or more pages within the target VMA 310-5 of the application process 300 have been modified (affirmative determination in block 402), the virtual memory manager 324 and/or dynamic memory allocator 326 will proceed to write the modified page(s) (alternatively referred to as "dirty page(s)") to the local NVM 314 on the client system (block 404). In addition, the MMBS page operations logger 332 will write metadata associated with the modified page(s) to a metadata log that is stored in the local NVRAM 316 on the client system (block 406). The operations of blocks 404 and 406 are schematically illustrated in FIGS. 5A and 5B.

Figure 5A:
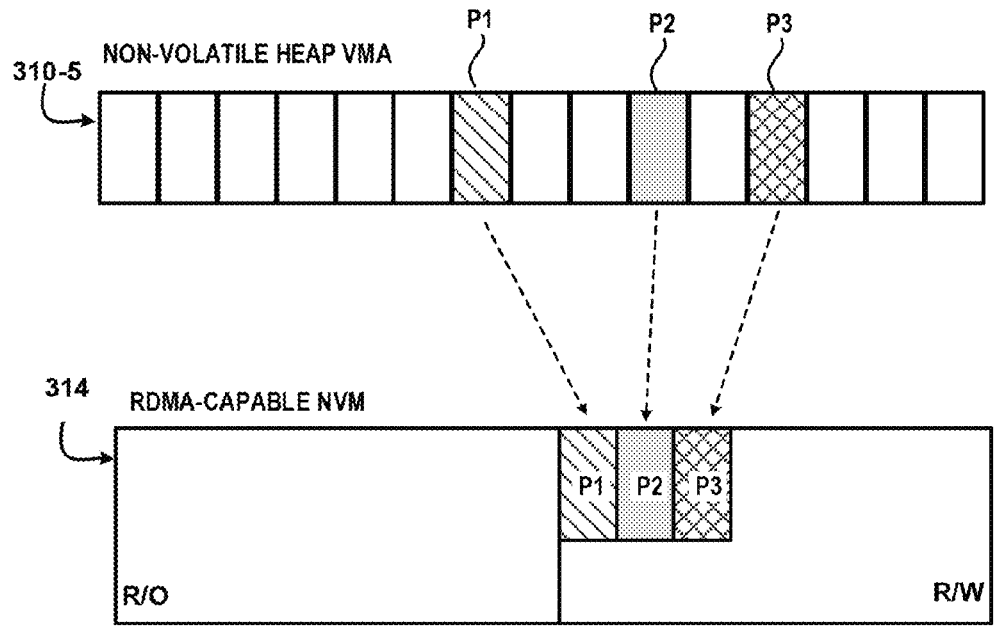
FIGS. 5A, 5B, 5C, 5D, 5E, 5F, 5G, and 5H schematically show the state of memory and storage elements of the system of FIG. 3 at certain points during the process flow of FIGS. 4A and 4B, according to an embodiment of the invention.
Figure 5B:
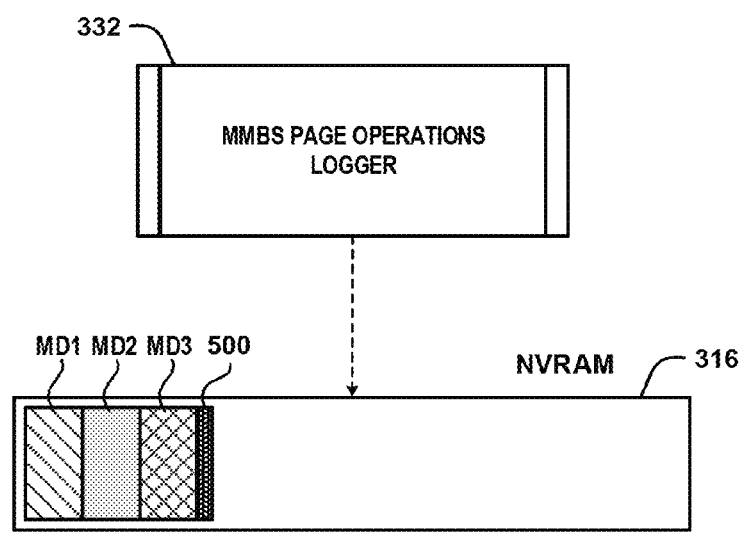

For example, FIG. 5A schematically illustrates an example operation in which three memory pages P1, P2, and P3 within the application VMA 310-5 have been written to a designated checkpoint region on the local NVM 314. As shown in FIG. 5A, the local NVM 314 comprises designated checkpoint regions which can be designated as R/O (read-only) or R/W (read-write). In one embodiment, the modified pages (e.g., P1, P2, P3) are initially written to a checkpoint region in the local NVM 314 which is designated as R/W. Furthermore, FIG. 5B schematically illustrates an example operation in which the page operations logger 332 has written three blocks of metadata MD1, MD2, and MD3 to the local NVRAM 316, which are associated with the three modified pages P1, P2, and P3, respectively, in the local NVM 314. In one embodiment, the blocks of metadata are written to a circular metadata log on the local NVRAM 316.

Referring back to FIG. 4A, as modified (dirty) pages of the target VMA 310-5 are written to the local NVM 314, the page operations logger 332 will maintain a count (referred to as "dirty page count") of the number of modified pages which have been written to the local NVM 314 but which have not yet been mirrored to the remote backup system. When the dirty page count has met a predefined dirty page count threshold (affirmative determination in block 408), an asynchronous mirroring process is initiated to transmit and store a copy of the modified pages of the target VMA 310-5 to the remote backup system. As an initial step, as shown in the example embodiment of FIG. 5B, the page operations logger 332 will log a threshold hit marker 500 in the local NVRAM 316 to indicate that the dirty page count threshold has been met by virtue of a given modified page and associated metadata (e.g., P3 and MD3) being written to the respective local NVM 314 and NVRAM 316.

Further, referring to FIG. 4A, a "Threshold Hit" message is transmitted from the client system 200 to the remote backup system 240 to wake up the remote backup system 240 and trigger the remote backup system 240 to proceed with an asynchronous mirroring of the modified pages associated with the target VMA 310-5 (block 410). The primary backup process 352 of the remote backup system 240 responds to the "Threshold Hit" message by posting a "RDMA Read" of the current metadata log information in the NVRAM 316 on the client system 200 and by transferring a copy of the current metadata log information from the NVRAM 316 directly into a metadata log portion of the NVRAM device 360 on the remote backup system 240 (block 412). When the remote backup system issues a "RDMA Read" to the client system, the remote backup system actively operates to "pull" the current metadata log information from the NVRAM 316 of the client system into the metadata log portion of the NVRAM 360 on the remote backup system, while the client system remains passive with regard to the RDMA read operation (e.g., client system issues no operation, uses no CPU cycles, receives no indication that pull has completed, etc.). The backup system then processes the current metadata log information (e.g., parses, compresses, etc.) stored in the NVRAM 360 (block 414).

Next, the backup system posts one or more additional "RDMA Read" operations of the persisted modified page(s) in the NVM 314 of the client system and transfers a copy of the modified page(s) from the NVM 314 directly into a page data portion of the NVRAM 360 of the backup system (block 416). With this process, the remote backup system actively operates to "pull" a copy of the modified page(s) from the NVM 314 of the client system into the page data portion of the NVRAM 360 on the remote backup system, while the client system remains passive with regard to the RDMA read operation. Continuing with the example process flow schematically illustrated in FIGS. 5A and 5B, the example embodiment of FIG. 5C schematically illustrates a state of the storage on the backup system as a result of the RDMA Read operations (blocks 412 and 416, FIG. 4A) in which a copy of the modified pages P1, P2, and P3 and associated metadata log information MD1, MD2, and MD3 are mirrored and stored in the NVRAM 360 on the backup system.

Figure 5C:
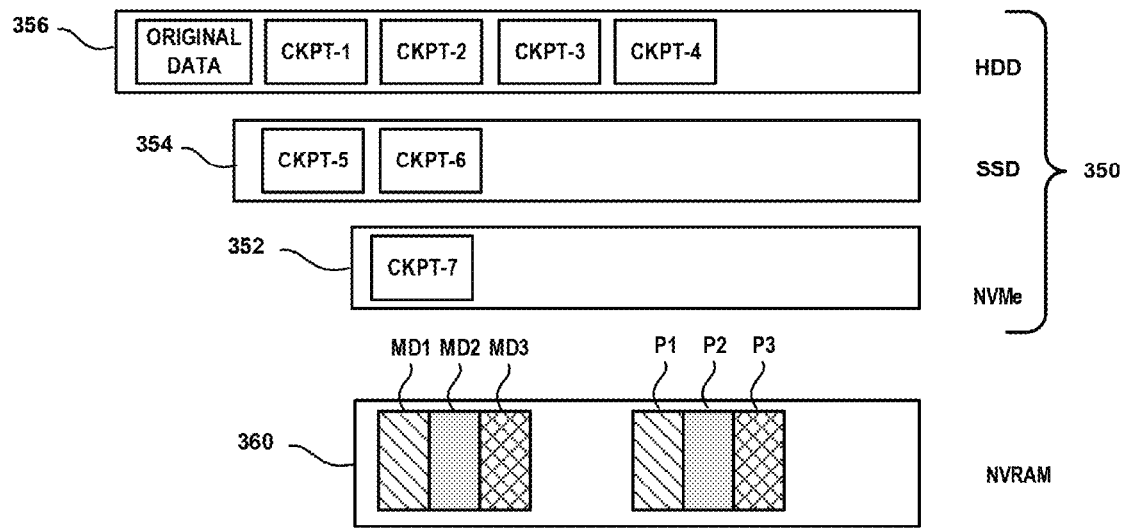

As further shown in the example embodiment of FIG. 5C, the storage tiering hierarchy 350 of the backup system is populated with a plurality of previous checkpoint images (CKPT-1, CKPT-2, . . . , CKPT-7) of the application running on the client system. For example, a most recent checkpoint image CKPT-7 is shown to be stored in the first tier storage 352 (e.g., NVM). Further, previous checkpoint images CKPT-5 and CKPT-6 are shown to be stored in the second tier storage 354 (e.g., SSD), and previous checkpoint images CKPT-1, CKPT-2, CKPT-3, and CKPT-4 are shown to be stored on the third tier storage 356 (e.g., HDD). In addition, a block of original application data (ORIGINAL DATA) is also shown to be stored on the third tier storage 356. As discussed herein, the different checkpoint images (CKPT-1, CKPT-2, CKPT-7) can be stored and moved to different storage tiers of the tiering hierarchy 350 based on application tags included in metadata that is pulled to the remote backup system from the NVRAM 316.

What has been described up to this point in the process flow of FIG. 4A is essentially a remote system driven asynchronous mirror of the modified persisted pages associated with the target VMA 310-5 of the application process 300. As illustrated in the example embodiment of FIG. 5C, the execution of the RDMA Read operations (of blocks 412 and 416, FIG. 4A) results in a transient mirrored version of a current set of modified pages of the target VMA 310-5 being stored in in a low-latency log device (e.g., NVRAM 360) on the backup system. Referring to FIG. 4B, a next logical step in the process flow comprises utilizing the page data and metadata stored in the NVRAM 360 on the backup system to build a view of the VMA modifications (which will eventually become part of a new checkpoint image) on the first tier storage 352 (e.g., NVMe) to free up the space on the NVRAM 360 (block 418).

Figure 5D:
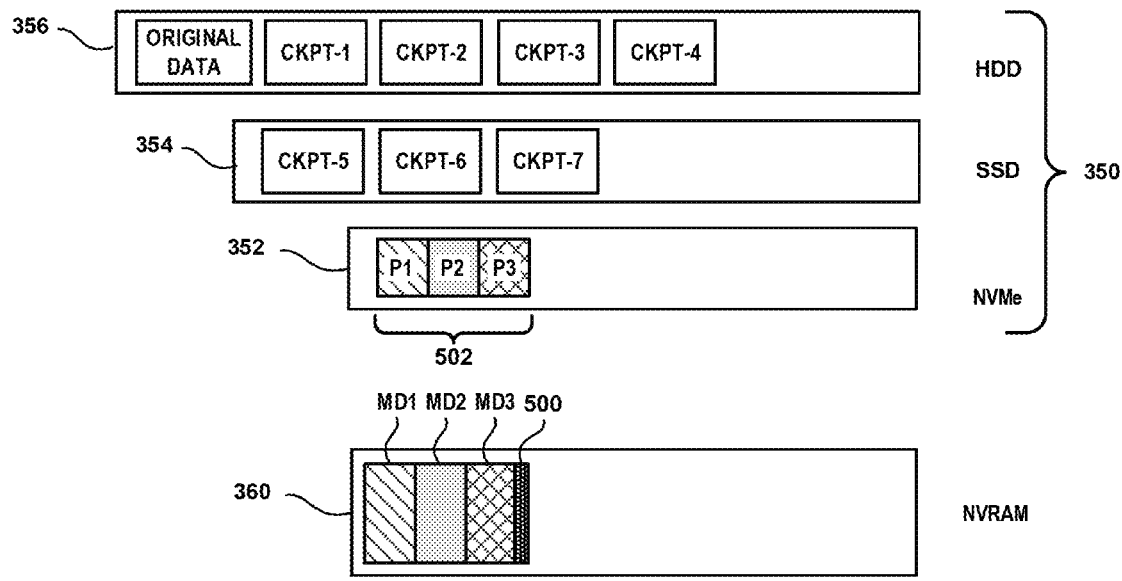

For example, continuing with the example process flow schematically illustrated in FIGS. 5A, 5B, and 5C, the example embodiment of FIG. 5D schematically illustrates a state of the storage on the backup system after vacating the page data of the modified pages P1, P2, and P3 from the NVRAM 360 to the first tier storage 352, wherein the modified pages P1, P2 and P3 comprises a set of pages that form an initial checkpoint image 502. As further shown in FIG. 5D, the most recent checkpoint image CKPT-7 is moved from the first tier storage 352 to the second tier storage 354.

The process flow (blocks 402 through 418) continues as discussed above whereby the backup system asynchronously mirrors modified pages of the target VMA 310-5 which are modified by the application process 300. When a checkpoint request is issued by the application (affirmative result in block 420), a checkpoint record is written to the NVRAM 316 on the client system by the page operations logger 332 (block 422) to initiate a checkpoint save operation by the backup system. In particular, the application process 300 will issue a checkpoint request when the application process 300 wants to save a checkpoint image of a current state of the VMA 310-5 along with associated metadata including static data variables selected by the application process 300. The checkpoint record added to the operations log in the NVRAM 316 by the page operations logger 332 triggers the transmission of a generic "Checkpoint Request" notification message from the client system to the backup system to notify the backup system to read new metadata log information in the NVRAM 316 (block 424) and complete the generation of a memory checkpoint image using copies of modified memory pages residing on the backup system.

The remote backup system responds to the "Checkpoint Request" notification message by posting a "RDMA Read" of the new metadata log information in the NVRAM 316 on the client system and by transferring a copy of the new metadata log information from the NVRAM 316 on the client system directly into a metadata log portion of the NVRAM device 360 on the remote backup system (block 426). In one embodiment of the invention, the new metadata log information comprises the checkpoint record written by the page operations logger 332. In another embodiment, the new metadata log information comprises one or more additional blocks of metadata in the NVRAM 316, which is associated with one or more additional modified pages that have been written to the NVM 314 on the client system since the previous asynchronous mirroring operation. As noted above, when the remote backup system issues a "RDMA Read" to the client system, the remote backup system operates to "pull" the new metadata log information from the NVRAM 316 of the client system into the metadata log portion of the NVRAM 360 on the remote backup system, while the client system remains passive with regard to the RDMA read operation. The backup system then processes the new metadata log information (e.g., parses, compresses, etc.) stored in the NVRAM 360 (block 428).

Next, the backup system posts one or more additional "RDMA Read" operations of the additional modified page(s) in the NVM 314 of the client system and transfers a copy of the modified page(s) from the NVM 314 of the client system directly into a page data portion of the NVRAM 360 of the backup system (block 430). With this process, the remote backup system actively operates to "pull" a copy of one or more additional modified pages that have been written to the NVM 314 on the client system since the previous asynchronous mirroring operation, and directly stores the copy of each modified page(s) into the page data portion of the NVRAM 360 on the remote backup system.

Once the backup system has obtained copies of the modified pages and associated metadata corresponding to the checkpoint request issued by the application process 300, the backup system will generate and save a new checkpoint image according to the information contained in the logged checkpoint record (block 432). In one embodiment, a checkpoint image comprises a collection of page data and metadata that is bundled and tagged as a saved checkpoint backup. In one embodiment, the new checkpoint image is initially stored in the first tier storage 352 but can be moved to another storage tier in the storage tiering hierarchy 350 based on information (e.g., tags) provided by the application process and included in checkpoint record (block 434). In another embodiment, one or more partial VMA checkpoint images could be combined together, or otherwise added to other checkpoint images to create additional full checkpoint images. Furthermore, the application process 300 executing on the client system can query and access older checkpoints and retrieve one or more checkpoints from the backup system to restore the application data to a previous state.

Figure 5E:
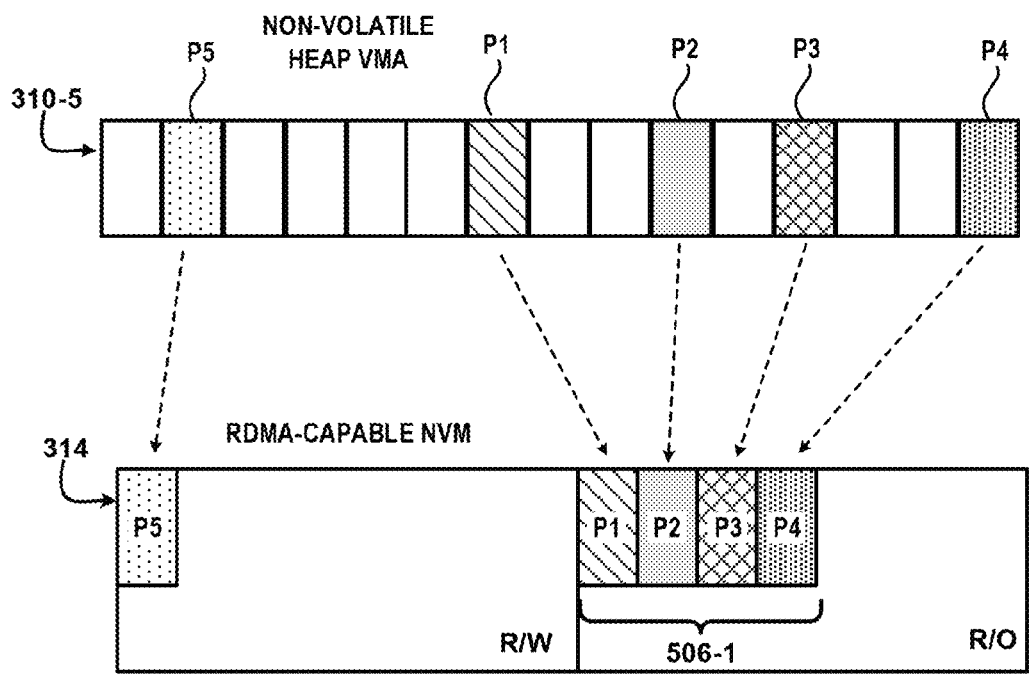
Figure 5F:
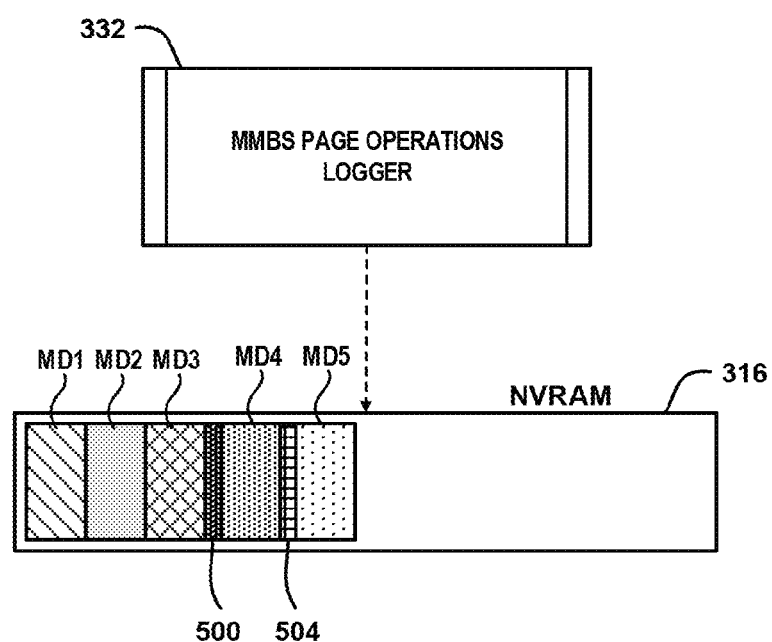

Continuing with the process discussed above with reference to FIGS. 5A, 5B, 5C, and 5D, an example process flow for steps 422 through 432 (FIG. 4B) is schematically illustrated in FIGS. 5E, 5F, 5G, and 5H. In particular, FIG. 5E illustrates a state of the memory on the client system in which two additional modified memory pages P4 and P5 within the target VMA 310-5 have been written to the designated checkpoint region on the local NVM 314 subsequent to the previous RDMA read operations in which the modified memory pages P1, P2 and P3 were mirrored to the backup system. Furthermore, FIG. 5F illustrates an example operation in which the page operations logger 332 has written additional blocks of metadata MD4 and MD5 to the local NVRAM 316, which are associated with the modified pages P4 and P5, respectively, written to the local NVM 314.

FIG. 5F further illustrates an example operation in which a checkpoint record 504 is written to the metadata log of the NVRAM 316 at a time subsequent to the logging of the metadata block MD4 but prior to the logging of the metadata block MD5. In this example, it is assumed that the application process 300 issued a checkpoint request command after a copy of the modified page P4 of the VMA 310-5 was written to the local NVM 314, and that a copy of the modified page P5 of the target VMA 310-5 was written to the local NVM 314 after the application process 300 issued the checkpoint request command. In this regard, it is assumed that the application process 300 requested to save a checkpoint image 506-1 comprising modified pages P1, P2, P3 and P4. As shown in FIG. 5E, the local copy of the checkpoint image 506-1 is persisted in an RIO region of the designated checkpoint region of the local NVM 314. In contrast, the newly added modified page P5 is maintained in R/W region of the designated checkpoint region of the local NVM 314, where other modified pages to be checkpointed can be written and stored.

Figure 5G:
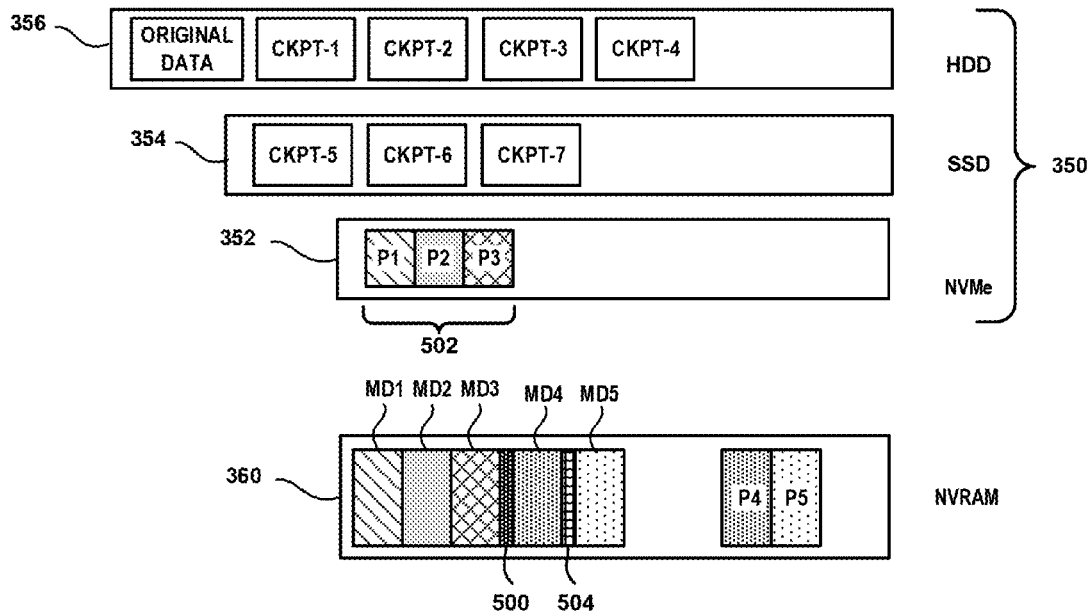
Figure 5H:
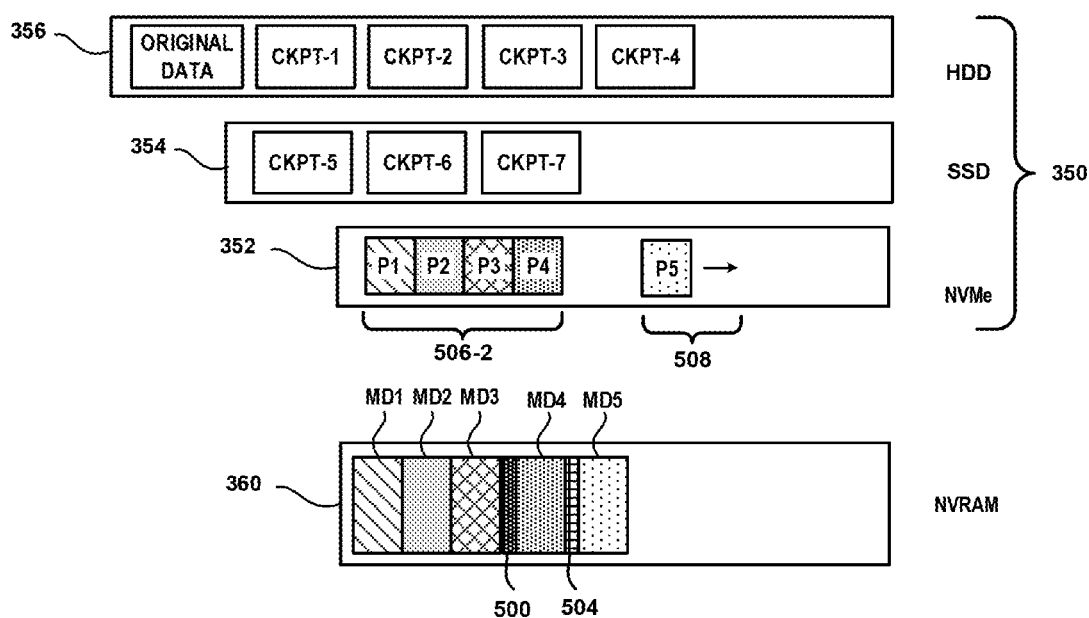

Furthermore, FIG. 5G illustrates a state of the storage on the backup system following the RDMA Read operations (of blocks 426 and 430, FIG. 4B) in which copies of the modified pages P4 and P5, the associated metadata log information MD4 and MD5, and the checkpoint record 504 are mirrored and stored in the NVRAM 360 on the backup system. In addition, FIG. 5H illustrates a state of the storage on the backup system after a remote copy of the checkpoint image 506-2 has been generated on the backup system. In particular, FIG. 5H shows a state which results after the modified page P4 is vacated from the NVRAM 360 to the first tier storage 352 and bundled with the page data P1, P2, and P3 to form the remote checkpoint image 506-2, which is a copy of the local checkpoint image 506-1 in the local NVM 314 on the client system (FIG. 5E).

FIG. 5H further shows that the copy of the modified page P5 is vacated to the first tier storage 352 and included as part of a new (partial) checkpoint image 508 that is partially formed. The partial checkpoint image 508 may be subsequently populated with additional modified pages, which are asynchronously mirrored to the backup system at some later time in response to another checkpoint request command, or combined with another memory checkpoint image.

It is to be appreciated that there are various advantages to the implementing asynchronous in-memory data backup systems and methods as discussed herein. For example, the techniques discussed herein allow state-of-the-art in-memory data management applications to readily backup their data in the native memory format without marshaling and unmarshaling the data to be compatible with other persistency mechanisms. Moreover, techniques discussed herein allow for modifications to a standard memory allocator library to include APIs that allow an application to control the creation, tagging, querying and restoring of VMA checkpoints. Furthermore, the RDMA protocols discussed herein allow for the implementation of an RDMA attached backup appliance that can potentially keep up with accessing and mirroring a large amount of memory checkpoint images generated by a client application, especially in instances where only modified data is transferred and checkpointed. Moreover, additional APIs can be included to provide for zeroed or pattern filled data pseudo-transfer via simple messages.

Another advantage to utilizing remote driven backup mechanisms as discussed herein is that such mechanisms require no special knowledge of the client system's data type or layout, and require limited resources on the client system for accessing and mirroring memory checkpoint images. Furthermore, while the in-memory backup techniques discussed herein can back up memory page data, such system can be readily configured to work with any system which persists segments of RDMA addressable data.

A further advantage to utilizing remote driven backup mechanisms as discussed herein is that the system can be configured with application defined tags, which include information to enable remote-driven services to extract and further operate on memory checkpoint images.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
  receiving, by a data backup system, notification of a checkpoint request issued by a process executing on a host computing system to store a copy of a checkpoint image comprising one or more memory pages that reside in a first memory region of memory on the host computing system;
  pulling, by the data backup system, a copy of metadata from a metadata log residing in a second memory region of memory on the host computing system, wherein the metadata is associated with the one or more memory pages of the checkpoint image;
  pulling, by the data backup system, a copy of the one or more memory pages of the checkpoint image from the first memory region of memory on the host computing system;
  generating, by the data backup system, a copy of the checkpoint image using the copies of the one or more memory pages and the associated metadata pulled from the host computing system; and
  storing, by the data backup system, the copy of the checkpoint image in a storage device on the data backup system;
  wherein the copy of the checkpoint image stored in the storage device on the data backup system comprises a same in-memory format as the checkpoint image residing in the first memory region of memory on the host computing system.

2. The method of claim 1, wherein pulling a copy of the metadata from the metadata log residing in the second memory region of memory on the host computing system comprises performing, by the data backup system, at least one remote direct memory access (RDMA) read operation to transfer the copy of the metadata from a non-volatile random access memory device on the host computing system to a non-volatile random access memory device on the data backup system.

3. The method of claim 2, wherein pulling a copy of the one or more memory pages of the checkpoint image from the first memory region of memory on the host computing system comprises performing, by the data backup system, one or more RDMA read operations to transfer the copy of the memory pages from a RDMA-enabled non-volatile memory on the host computing system to the non-volatile random access memory device on the data backup system.

4. The method of claim 1, wherein the one or more memory pages of the checkpoint image comprises modified memory pages which are stored in the first memory region of memory on the host computing system using copy-on-write operations.

5. The method of claim 1, further comprising executing a page operations logger process on the host computing system, wherein the page operations logger is configured to generate the metadata that is stored and maintained in the metadata log residing in the second memory region of memory on the host computing system, and wherein the page operations logger is configured to transmit the checkpoint request message, which is issued by the process, to the data backup system.

6. The method of claim 1, wherein the metadata pulled from the host computing system comprises a checkpoint record comprising information that specifies at least one of (i) a storage tier on the data backup system in which the checkpoint image should be stored and (ii) a data processing operation to be performed on the checkpoint image by the data backup system.

7. The method of claim 1, further comprising:
  receiving, by the data backup system, a page count threshold message transmitted from the host computing system, wherein the page count threshold message notifies the data backup system that a number of memory pages residing in the first memory region of memory on the host computing system, which have not yet been backed up by the data backup system, has met a predefined threshold;
  in response to the page count threshold message, the data backup system performing a process comprising:

pulling a copy of metadata from the metadata log residing in the second memory region of memory on the host computing system, which is associated with the memory pages which have not yet been backed up by the data backup system;

pulling a copy of the memory pages from the first memory region of memory on the host computing system, which have not yet been backed up by the data backup system; and generating, by the data backup system, a preliminary checkpoint image using the copies of the memory pages and the associated metadata pulled from the host computing system.

8. The method of claim 7, wherein the page count threshold message notifies the data backup system that a number of modified memory pages residing in the first memory region of memory on the host computing system, which have not yet been backed up by the data backup system, has met a predefined threshold.

9. The method of claim 1, wherein the first memory region and the second memory region comprise designated memory regions on a same memory device.

10. An article of manufacture comprising a processor-readable storage medium having stored therein program code of one or more software programs, wherein the program code is executable by one or more processors to implement a process comprising:

receiving, by a data backup system, notification of a checkpoint request issued by a process executing on a host computing system to store a copy of a checkpoint image comprising one or more memory pages that reside in a first memory region of memory on the host computing system;

pulling, by the data backup system, a copy of metadata from a metadata log residing in a second memory region of memory on the host computing system, wherein the metadata is associated with the one or more memory pages of the checkpoint image;

pulling, by the data backup system, a copy of the one or more memory pages of the checkpoint image from the first memory region of memory on the host computing system;

generating, by the data backup system, a copy of the checkpoint image using the copies of the one or more memory pages and the associated metadata pulled from the host computing system; and storing, by the data backup system, the copy of the checkpoint image in a storage device on the data backup system;

wherein the copy of the checkpoint image stored in the storage device on the data backup system comprises a same in-memory format as the checkpoint image residing in the first memory region of memory on the host computing system.

11. The article of manufacture of claim 10, wherein the program code for pulling a copy of the metadata from the metadata log residing in the second memory region of memory on the host computing system comprises program code that is executable by the one or more processors for performing, by the data backup system, at least one direct memory access (RDMA) read operation to transfer the copy of the metadata from a non-volatile random access memory device on the host computing system to a non-volatile random access memory device on the data backup system; and wherein the program code for pulling a copy of the one or more memory pages of the checkpoint image from the first memory region of memory on the host computing system comprises program code that is executable by the one or more processors for performing, by the data backup system, one or more RDMA read operations to transfer the copy of the memory pages from a RDMA-enabled non-volatile memory on the host computing system to the non-volatile random access memory device on the data backup system.

12. The article of manufacture of claim 10, wherein the one or more memory pages of the checkpoint image comprise modified memory pages which are stored in the first memory region of memory on the host computing system using copy-on-write operations.

13. The article of manufacture of claim 10, further comprising program code that is executable by the one or more processors for executing a page operations logger process on the host computing system, wherein the page operations logger is configured to generate the metadata that is stored and maintained in the metadata log residing in the second memory region of memory on the host computing system, and wherein the page operations logger is configured to transmit the checkpoint request message, which is issued by the process, to the data backup system.

14. The article of manufacture of claim 10, wherein the metadata pulled from the host computing system comprises a checkpoint record comprising information that specifies at least one of (i) a storage tier on the data backup system in which the checkpoint image should be stored and (ii) a data processing operation to be performed on the checkpoint image by the data backup system.

15. The article of manufacture of claim 10, further comprising program code that is executable by the one or more processors for performing a process comprising:

receiving, by the data backup system, a page count threshold message transmitted from the host computing system, wherein the page count threshold message notifies the data backup system that a number of memory pages residing in the first memory region of memory on the host computing system, which have not yet been backed up by the data backup system, has met a predefined threshold;

in response to the page count threshold message, the data backup system performing a process comprising:

pulling a copy of metadata from the metadata log residing in the second memory region of memory on the host computing system, which is associated with the memory pages which have not yet been backed up by the data backup system;

pulling a copy of the memory pages from the first memory region of memory on the host computing system, which have not yet been backed up by the data backup system; and generating, by the data backup system, a preliminary checkpoint image using the copies of the memory pages and the associated metadata pulled from the host computing system.

16. The article of manufacture of claim 15, wherein the page count threshold message notifies the data backup system that a number of modified memory pages residing in the first memory region of memory on the host computing system, which have not yet been backed up by the data backup system, has met a predefined threshold.

17. A system, comprising:
a storage device;
at least one processor; and a memory to store program code that is executable by the at least one processor to implement a data backup system, wherein the data backup system is configured to:

receive notification of a checkpoint request issued by a process executing on a host computing system to store a copy of a checkpoint image comprising one or more memory pages that reside in a first memory region of memory on the host computing system;

pull a copy of metadata from a metadata log residing in a second memory region of memory on the host computing system, wherein the metadata is associated with the one or more memory pages of the checkpoint image;

pull a copy of the one or more memory pages of the checkpoint image from the first memory region of memory on the host computing system;

generate a copy of the checkpoint image using the copies of the one or more memory pages and the associated metadata pulled from the host computing system; and store the copy of the checkpoint image in the storage device;

wherein the copy of the checkpoint image stored in the storage device comprises a same in-memory format as the checkpoint image residing in the first memory region of memory on the host computing system.

18. The system of claim 17, wherein the data backup system is configured to:

pull a copy of the metadata from the metadata log residing in the second memory region of memory on the host computing system by performing at least one direct memory access (RDMA) read operation to transfer the copy of the metadata from a non-volatile random access memory device on the host computing system to a non-volatile random access memory device on the data backup system; and pull a copy of the one or more memory pages of the checkpoint image from the first memory region of memory on the host computing system by performing one or more RDMA read operations to transfer the copy of the memory pages from a RDMA-enabled non-volatile memory on the host computing system to the non-volatile random access memory device on the data backup system.

19. The system of claim 17, wherein the one or more memory pages of the checkpoint image comprises modified memory pages which are stored in the first memory region of memory on the host computing system using copy-on-write operations.

20. The system of claim 17, wherein the data backup system is further configured to:

receive a page count threshold message transmitted from the host computing system, wherein the page count threshold message notifies the data backup system that a number of memory pages residing in the first memory region of memory on the host computing system, which have not yet been backed up by the data backup system, has met a predefined threshold; and in response to the page count threshold message, the data backup system is configured to:

pull a copy of metadata from the metadata log residing in the second memory region of memory on the host computing system, which is associated with the memory pages which have not yet been backed up by the data backup system;

pull a copy of the memory pages from the first memory region of memory on the host computing system, which have not yet been backed up by the data backup system; and generate a preliminary checkpoint image using the copies of the memory pages and the associated metadata pulled from the host computing system.

\* \* \* \* \*